US008919617B2

(12) United States Patent
Foley

(10) Patent No.: US 8,919,617 B2

(45) Date of Patent: Dec. 30, 2014

(54) CAULK GUN WITH EXPANSION DRIVE

(71) Applicant: Thomas S. Foley, Centennial, CO (US)

(72) Inventor: Thomas S. Foley, Centennial, CO (US)

(73) Assignees: Thomas S. Foley, Centennial, CO (US); George F. Coughlin, Centennial, CO (US)

( * ) Notice: Subject to any disclaimer, the term of this patent is extended or adjusted under 35 U.S.C. 154(b) by 95 days.

(21) Appl. No.: 13/678,549

(22) Filed: Nov. 16, 2012

(65) Prior Publication Data

US 2014/0138411 A1 May 22, 2014

(51) Int. Cl.

*G01F 11/00* (2006.01)
*B65D 83/00* (2006.01)
*B05C 17/005* (2006.01)

(52) U.S. Cl.

CPC .......... *B65D 83/0033* (2013.01); *B05C 17/005* (2013.01)

USPC ........... 222/386; 222/325; 222/326; 222/333; 222/391

(58) Field of Classification Search

CPC ........... B65D 83/0005; B65D 83/0038; B65D 83/0072; B05C 17/01; B05C 17/0123; B05C 17/00576

USPC .......................... 222/386, 391, 333, 325–327

See application file for complete search history.

(56) References Cited

U.S. PATENT DOCUMENTS

| | | | | | |
|---|---|---|---|---|---|
| 4,318,499 | A * | 3/1982 | Hamilton | ...................... | 222/327 |
| 4,343,460 | A * | 8/1982 | Gende | .......................... | 267/151 |
| 4,702,398 | A * | 10/1987 | Seager | .......................... | 222/386 |
| 6,321,945 | B1 * | 11/2001 | Girouard et al. | .............. | 222/113 |
| 6,640,998 | B1 | 11/2003 | Kern | | |
| 6,926,177 | B1 | 8/2005 | Scott et al. | | |
| 6,981,621 | B2 | 1/2006 | Brandeis et al. | | |
| 7,720,623 | B2 * | 5/2010 | Escobar Valderrama et al. | ............................... | 702/72 |
| 8,273,072 | B2 * | 9/2012 | Jahns et al. | ................... | 604/503 |
| 8,336,286 | B2 * | 12/2012 | Veltrop et al. | .................... | 59/78 |
| 8,376,193 | B2 * | 2/2013 | Veltrop et al. | ................ | 222/392 |
| 8,381,950 | B2 * | 2/2013 | Veltrop et al. | ................ | 222/392 |
| 8,602,267 | B2 * | 12/2013 | Drennow et al. | ............. | 222/214 |
| 2006/0163007 | A1 * | 7/2006 | Bukowski et al. | ............ | 187/269 |

* cited by examiner

*Primary Examiner* — Frederick C Nicolas

(74) *Attorney, Agent, or Firm* — Kyle W. Rost

(57) ABSTRACT

A dispensing tool is for use with a cartridge containing dispensable contents, wherein one end of the cartridge has a discharge nozzle and the opposite end contains a follower that can be pushed toward the nozzle to discharge the contents. A grip-type actuator of the tool advances a pressure plate against the follower to push it toward the nozzle. The tool has a pressure plate aligned with a holder that is sized to retain the cartridge with the follower in line with the pressure plate. A pantograph mechanism drives the pressure plate toward the follower and is driven by a grip-type actuator.

14 Claims, 5 Drawing Sheets

CAULK GUN WITH EXPANSION DRIVE

BACKGROUND OF THE INVENTION

1. Field of the Invention

The invention generally relates to dispensing and more specifically to a dispensing tool that operates in combination with a replaceable, insertable cartridge with a follower that is a part of the cartridge. The tool includes a grip-type actuator that drives a pressure plate against the follower. In a specific embodiment, the invention is a caulking gun that operates a short-body discharge assistant to produce a metered discharge of caulk.

2. Description of Related Art Including Information Disclosed Under 37 CFR 1.97 and 1.98

Sealant, adhesive, mastic, and other extrudable, settable construction materials may be supplied in sealed, typically cylindrical cartridges. The front end of a cartridge is temporarily sealed by a sheet of film or foil behind a leading nozzle. The user can pierce or break the seal immediately before using the contents, thus revealing the fresh and readily extrudable substance for discharge through the nozzle. The rear end of the cartridge is open and houses a follower that rests against the rear of the contents. Therefore, the method of use is to push the follower against the contents, discharging the contents out the nozzle. When the cartridge is empty, which equates to the follower having advanced to the rear of the nozzle, the cartridge is discarded.

A tool or more specifically, a caulking gun is used to apply the contents of such a cartridge as desired. A caulking gun typically provides a drop-in holder or receiver for the cartridge. The receiver supports the cartridge in semi-cylindrical, open-topped body that allows the cartridge to be dropped-in, with a front wall having a passage for the cartridge nozzle to extend beyond the front of the tool. The rear end of the receiver is joined to a discharge assistant that includes a pressure plate for engaging the follower. The pressure plate is sized to fit into the cartridge in order to drive forward the follower. Under user control, a grip-type actuator may operate either intermittently or continuously to drive the pressure plate. Conventionally, a pushing device interconnects the actuator with the pressure plate. Typically, the actuator incrementally advances the pushing device to advance the pressure plate. When the pressure plate has been fully advanced and cartridge has been emptied, the user operates a thumb release mechanism associated with the pushing device that allows him to withdraw the pressure plate from the cartridge and allowing the cartridge to be removed from the receiver.

Many different technologies can be used in a pushing device, including pneumatic, hydraulic, electric, and mechanical. However, in practical terms the pushing device will almost always be mechanical and very simple in structure. Unquestionably the most common pushing device is a pushrod with a bent or hooked rear end that serves as a handle. The associated actuator is a pivoted trigger on the handle of the caulking gun and a bindable advancement plate mounted on the pushrod via an aperture through the plate that is slightly larger than the diameter of the pushrod. The trigger operates by pushing forward on the bindable plate near its edge, thereby pushing forward on only one edge of the plate, which first tilts the plate into a binding position and then pushes forward the entire plate. The tilt causes the aperture of the advancement plate to bind with the pushrod, resulting in the entire pushrod being pushed forward with the advancement plate. In this way, trigger motion is converted into forward motion of the pressure plate. A spring pushes back on the advancement plate from its front face and untilts the advancement plate as soon as the trigger releases, leaving the advancement plate in an untilted position on the pushrod.

A spring-loaded brake plate constantly engages the pushrod in a tilted position to prevent rearward movement, with the result that the pushrod stays in its advanced position regardless of the advancement plate being released to untilted position. However, a thumb release allows the user to press the brake plate to release its grip on the pushrod, which allows the user to retract the pushrod when desired by pulling back on the handle.

A notorious problem with caulking guns of the type described is the substantial length of the pushrod. It is as long as the cartridge plus the actuator, with still additional length protruding from the rear of the actuator. When a new cartridge is in the gun, the pushrod extends to the rear by a maximum length, nearly doubling the length of the gun. A standard or popular size of caulk gun has a pushrod that extends approximately nine inches from the rear of gun. The rear extension is an aggravation to the user because it interferes with usage, especially in confined areas like inside cabinets, in closets, and behind toilets, to name a few.

Several technologies have been used to eliminate or shorten the pushrod of a caulking gun. WO 03/064056 discloses a caulking gun that replaces the pushrod with a pair of pushing chains that are fed from sides of the gun to combine in the center as a rigid pusher. This technology suffers the disadvantage of lacking the accepted open top receiver for inserting new cartridges. Instead, the cartridge is inserted at the front of the receiver and held in the gun by retaining clips. A further disadvantage is that the new cartridge must push back the pressure plate and pushing chains while initially being inserted, which adds difficulty to inserting the cartridge far enough to close the retaining clips.

U.S. Pat. No. 6,926,177 to Scott et al teaches a telescoping plunger that replaces the pushrod. The telescoping mechanism includes a turnbuckle that extends or retracts the pressure plate, and an electric drill is coupled to the gun to spin the turnbuckle. It is evident that hand operation of a turnbuckle is impractical. The necessary addition of the drill adds another dimension of excess size, plus it add considerable weight that tends to fatigue the user.

U.S. Pat. No. 6,640,998 to Kern teaches the use of a fixed pressure plate joined to the trigger assembly. The trigger draws the cartridge backwards against the fixed pressure plate, eliminating the need for a pushrod. Instead, the trigger assembly cuts a slot from the rear of the cartridge so that the cartridge can continue to move backwards against the pressure plate. This technology has the disadvantage of requiring increased force on the trigger to cut the slot, and when the cartridge is empty, it is needlessly complex to pull the trigger assembly free from the slot.

It would be desirable to produce an internal drive for a caulking gun, such that the maximum length of the caulking gun could be reduced in comparison with guns employing a full length pushrod. At the same time, it would be desirable to maintain the familiar features found in standard caulking guns, such as the open-topped receiver, the hand operated trigger and thumb release, and a light weight.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide a dispenser for caulk and other similar materials that are supplied in disposable cartridges, wherein the dispenser has a short body.

According to the invention, a dispensing tool operates in combination with a replaceable, insertable cartridge of predetermined dimensions. The cartridge contains dispensable contents that are to be dispensed from it by use of a dispensing tool. One end of the cartridge contains a follower that the associated dispensing tool will press forward to expel contents from the opposite end of the cartridge. A grip-type actuator of the dispensing tool advances a pressure plate against the follower, thereby advancing the follower toward an exit port of the cartridge to produce a metered discharge of the dispensable contents there through. The dispensing tool is formed of a holder that has proximal and distal ends and is sized to receive a cartridge of the predetermined dimensions. The holder retains the cartridge against advancement of the pressure plate toward the proximal end of the holder and against the follower. A pantograph mechanism is located intermediate the pressure plate and the grip-type actuator. The grip-type actuator provides a selectively actuated trigger that operates a pantograph extending mechanism to cause the pantograph to advance the pressure plate toward the distal end of said holder.

The accompanying drawings, which are incorporated in and form a part of the specification, illustrate preferred embodiments of the present invention, and together with the description, serve to explain the principles of the invention. In the drawings:

DETAILED DESCRIPTION OF THE INVENTION

Figure 1:
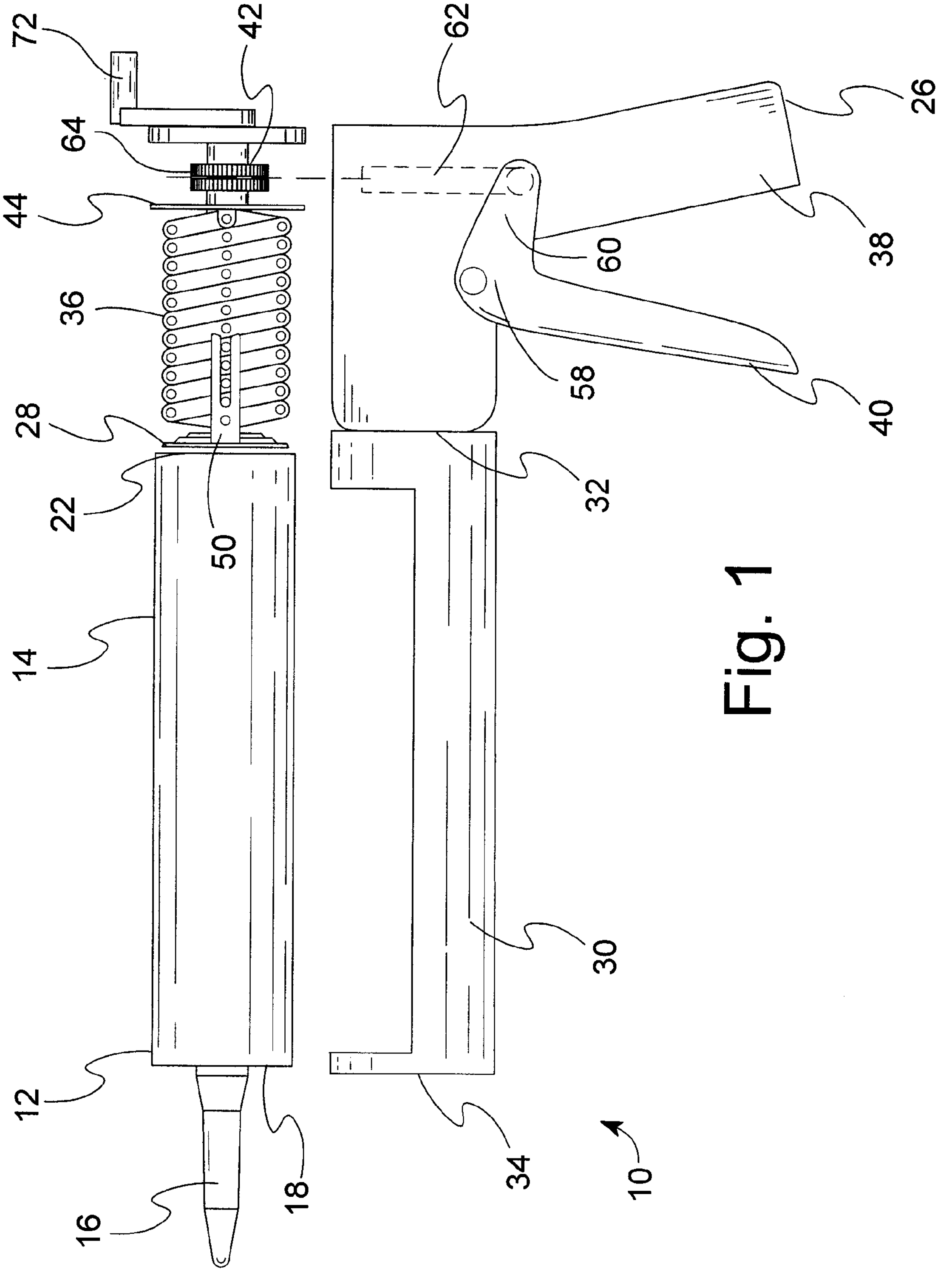
FIG. 1 is an exploded, side elevational view of a caulking gun and cartridge showing a pantograph advancement mechanism in compacted position, and showing a first embodiment of an actuator mechanism with a rotary gear and with a manually operated drive pawl shown in phantom.

In the broad terms, the invention is a compact dispenser 10 for discharging material from a cartridge by incrementally advancing a pressure plate against the cartridge to force the material out of the cartridge at a predetermined exit. In more specific terms, the invention is an expansion drive for discharging the contents of a replaceable cartridge, where the expansion drive extends and contracts within fixed confines of a compact dispenser. The dispenser was developed to perform the functions of what is often called a "caulking gun," which operates in combination with a replaceable, insertable cartridge of predetermined dimensions that fit into a caulking gun of a predetermined, compatible or matching size. The expansion drive accommodates the length of the cartridge cylinder while maintaining an overall tool length of less than twice the cartridge cylinder length.

With reference to FIGS. 1, 2, 5, 6, and 7 and as described above, the typical cartridge 12 has a reservoir cylinder 14 of predetermined dimensions, with a discharge nozzle 16 at its proximal end 18, and a follower 20 at least slightly inset at its open distal end 22. At least when the cartridge is new, a supply of contained material 24 is housed between the two ends. The design of the cartridge 12 anticipates that a dispensing tool will push the follower 20 toward the nozzle 16 to discharge the contained material 24.

The most common and typically inexpensive type of pre-existing caulking gun is formed of a gun body that receives such a cartridge 12 in a holder portion of gun body. In addition to a gun body, the pre-existing caulking gun includes a pushrod that moves longitudinally forward and backward in gun body. The length of this pushrod might be equal to or greater than the length of the gun body. A typical ten ounce cartridge has a cylindrical body that is eight and one-half inches long. Measurements of a sample caulking gun sized for such a ten ounce cartridge show that the gun body is eleven and three-eighths inches long, while the pushrod is eleven and five-eighths inches long. When the pushrod is at its forward limit of movement, the rear of the pushrod protrudes from the rear of the gun body by three-eighths of an inch. When the pushrod is at its rearward limit of movement, the rear of the pushrod protrudes from the rear of the gun body by nine and one-eighth inches. These sample dimensions show that when a pushrod is fully retracted for inserting a new cartridge, a caulking gun plus retracted pushrod have an unwieldy length of about twenty and one-half inches, which is more than twice the length of the eight and one-half inch cylinder that fits the sample caulking gun.

As discharge of the material from the cartridge is desired, the user operates an advancing mechanism in the caulking gun to advance the pushrod against the follower 20, incrementally feeding the pushrod forward into the cartridge. This tool design has the notorious disadvantage that the pushrod, when drawn back, interferes with handling and using the tool. Accordingly, the compact aspect of the invention is the creation of similarly functioning tool that either totally eliminates or substantially reduces the length of pushrod that will extend from the rear of a dispensing tool.

Cartridges 12 might contain any of a variety of dispensable contents 24. Often the contents are viscous compositions with paste-like consistency. Examples include many different materials that are described by the ubiquitous name, "caulk," by way of example including both viscous acrylic and uncured silicone materials. Other suitable materials supplied in similar cartridges are mastics, adhesives, and crack fillers. The cartridge is described because it is a mating component of the dispensing tool 10 but not because the invention is limited to any particular dischargeable material within the cartridge.

The dispensing tool 10 provides several components that function in the manner familiar to the users of prior art caulking guns or function in a manner conforming to the requirements for discharging a cartridge 12. One of these is a grip-type actuator 26 of the tool 10 that dispenses the dispensable contents of a cartridge 12 by advancing a pressure plate 28 against the follower 20. In turn, the follower 20 advances within the cylinder 14 toward the exit port or nozzle 16 of the cartridge 12 to produce a metered discharge of the dispensable contents 24 through the nozzle. Tool 10 provides a holder 30 having a proximal end 32 and a distal end 34, sized to receive a cartridge of predetermined size and to retain the cartridge 12 against advancement of the pressure plate 28 toward the distal end 34 of the holder. Typically, the distal end of holder 30 is an end wall that is slotted to allow passage of the nozzle 16, but which retains the cylinder 14 against pressure of the pressure plate 28 on the follower 20, such that the follower 20 advances in the cylinder 14 to discharge the contents through the nozzle 16.

The dispensing tool 10 achieves compact sizing by using a pantograph 36 that is located intermediate the pressure plate 28 and a grip-type actuator 26. The grip-type actuator assembly 26 provides a fixed handle 38 and selectively actuated trigger 40 that operates a pantograph extending mechanism 42 to cause the pantograph 36 to advance the pressure plate 28 toward the distal end 34 of holder 30.

The term, "pantograph," has been applied to a type of mechanical movement. Another term of substantially identical meaning is "lazy tongs." A common definition for either movement is extensible tongs, consisting of a series of pairs of crossing pieces or crossing links, each pair pivoted together in the middle and connected with the next pair at the extremities. Where the definition refers to "tongs," it might be inferred that the common usage of this movement employs the final pair of crossing links to grasp a remote object. This usage would utilize free extremes of the final pair of crossing links to come together as the mechanism extends, to perform a grasping motion. The present description of the invention is not bound to fully follow the inferential requirements of a pantograph structure. Instead, as shown in FIGS. 1-3 and 5-7, the pairs of crossing links at one or both ends of a pantograph structure 36 may be truncated to about half length so as to terminate near the middle pivot points, so that these pivot points can serve as attachment points. The middle pivot points of the end pair or pairs of crossing links may be attached to fixed anchoring ears that serve as pivot mountings. The forward or distal end of the pantograph is connected to the pressure plate 28. The rear or proximal end of the pantograph is attached to a base plate 44 at the front of the pantograph extending mechanism 42. In this way, an extending pantograph can advance the pressure plate 28 from the base plate 44 without having to accommodate the closing of the free extremes of the front and rear end links. However, the inferred structure optionally might be utilized with the addition of sliding mounts that receive the free extremes of the end links, although the sliding mounts could introduce needless freedom into the connections.

The cartridge cylinder 14 establishes the necessary peripheral configuration of the follower 20 and the desirable peripheral configuration of pressure plate 28. The follower 20 matches the inner diameter of the cylinder in order to provide an effective seal against rearward loss of the contained material 24. The periphery of the follower 20 is circular or otherwise conforming to the cylinder wall, in order to seal against the cylinder wall. The pressure plate 28 can be shaped as a disk or other suitable shape of slightly smaller diameter than the follower 20, so that the pressure plate is readily received into the cylinder. Similarly, it is necessary for the pantograph 36 to enter the cylinder as the pressure plate is advanced, and this requires that the pantograph have a fully compacted height no greater than the inside diameter of the cylinder 14, as best shown in FIG. 1.

Figure 2:
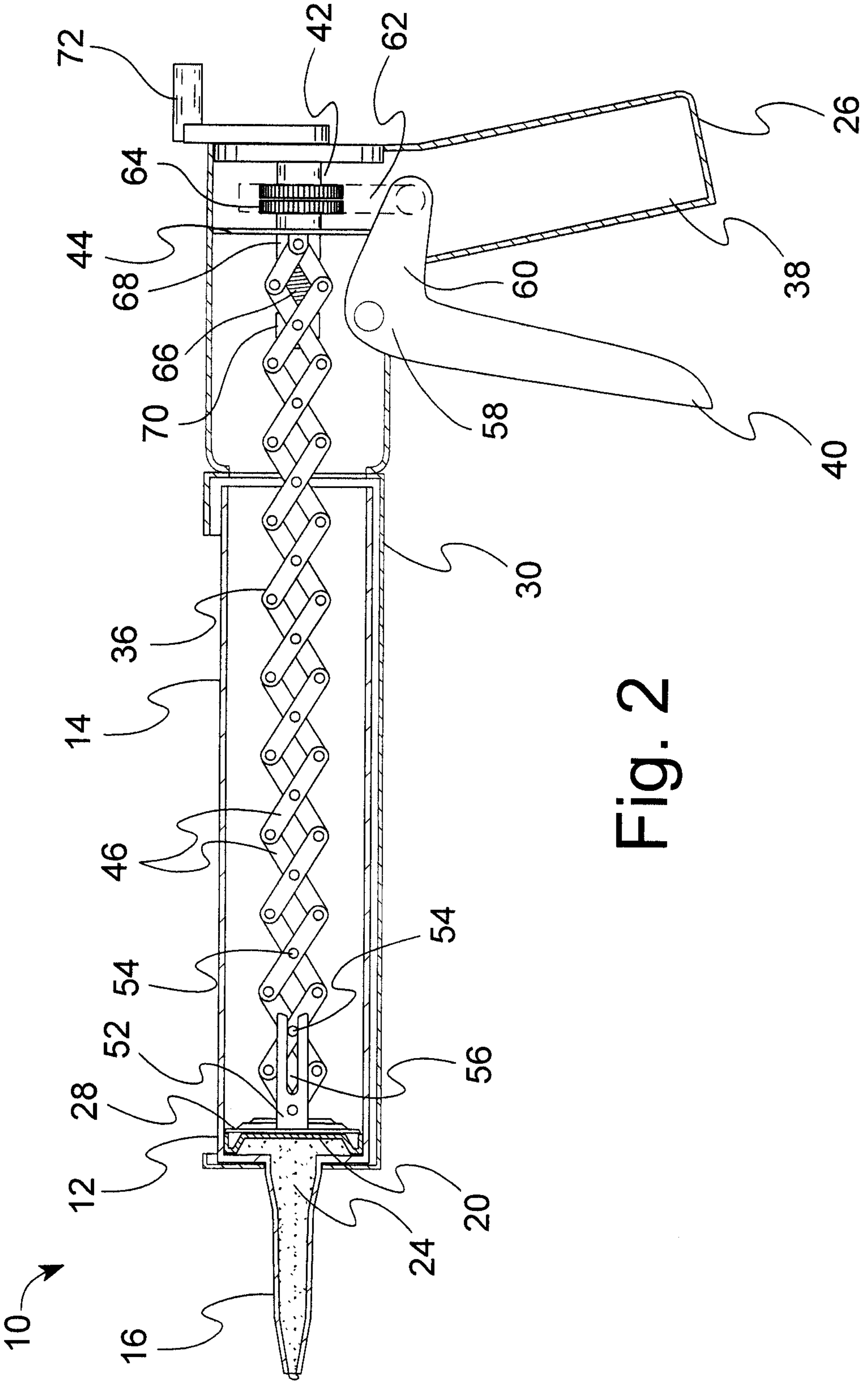
FIG. 2 is a side elevational view of a caulking gun and cartridge in partial vertical cross-section, with a pantograph advancement mechanism in extended position and again showing the first embodiment of an actuator mechanism with a rotary gear and with the manually operated drive pawl shown in phantom.

As the pantograph expands, the pivoted links 46 close along the longitudinal axis of expansion movement. With expansion, the height of the pantograph 36 shortens, thereby reducing the possibility of interference with the cylinder wall, as best shown in FIG. 2. However, the pantograph has the possible limitation that it may deform under longitudinal pressure. For example, a single pantograph structure may have little lateral thickness, with the result that is may be prone to lateral flexing or bowing. As shown in FIG. 2, as a single pantograph extends, its height decreases; and this may lead to bowing.

Figures 3, 4:
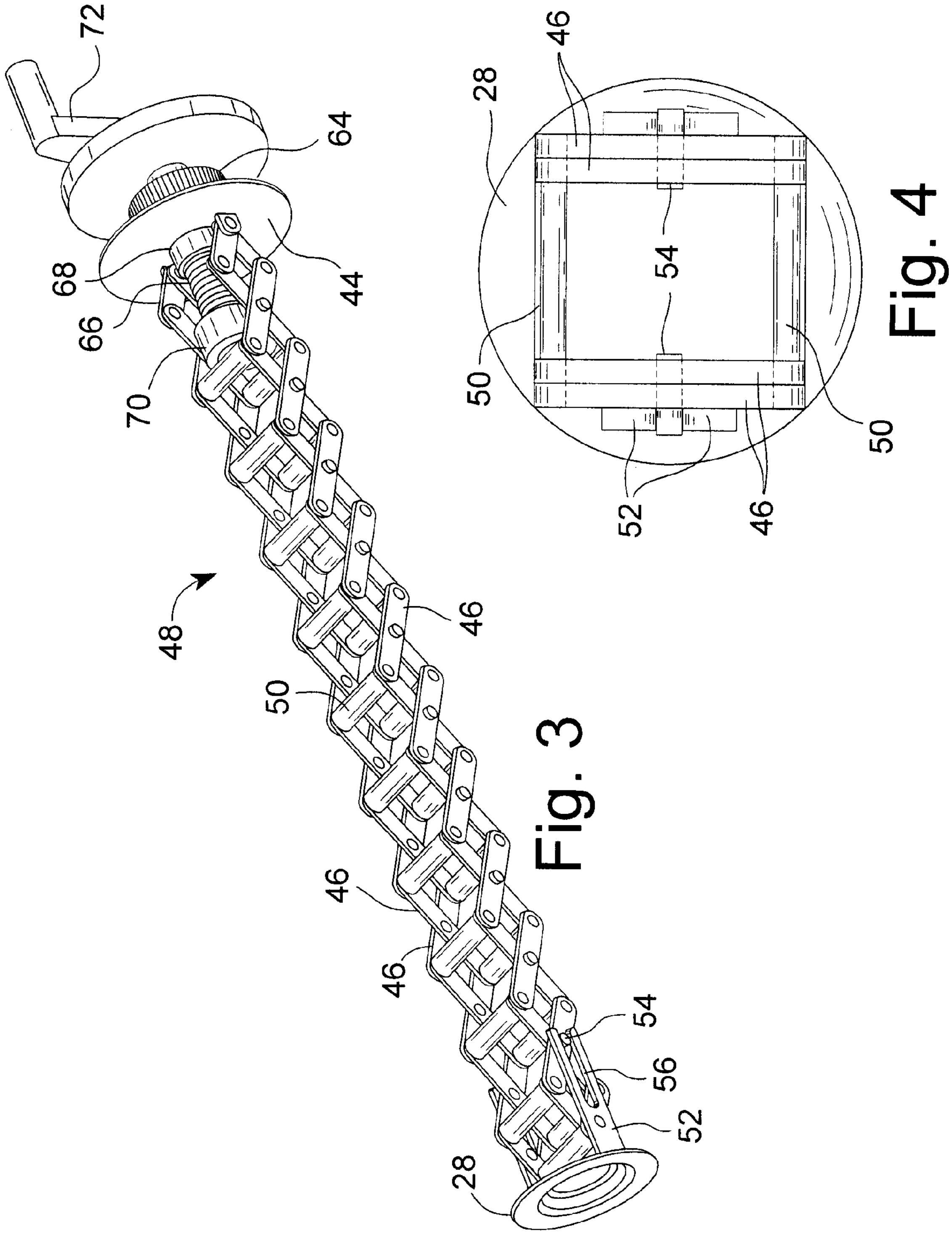
FIG. 3 is an isometric view of an extended pantograph advancement mechanism formed of dual pantograph structures.
FIG. 4 is an end view of a compacted dual pantograph advancement mechanism and pressure plate, showing relative sizing between the pantograph mechanism and the pressure plate.

With reference to FIGS. 3 and 4, the pantograph mechanism 48 resolves the problem of flexing and bowing by combining at least two pantograph structures arranged in parallel. For convenience of description, the terms "pantograph" or "pantograph structure" may refer to a single or compound pantograph component, while the term, "pantograph mechanism" will refer only to compound pantograph components, formed of two or more pantograph structures. The pantograph mechanism 48 of FIG. 3 combines two pantograph structures 36 in parallel, such that they are simultaneously moveable between compacted and extended configurations. The parallel pantograph structures 36 are interconnected by spacers 50 of preselected length that laterally separate the two single pantographs 36 to form a pantograph mechanism.

With the two pantographs 36 at lateral separation, each must have a compacted height allowing it to enter a cartridge cylinder 14. From knowledge of the inside diameter of the cylinder and the width of the pantograph mechanism, it is possible to calculate the maximum height of the pantograph mechanism to allow the compacted mechanism to enter the cylinder. A similar calculation can be made with respect to the diameter of the pressure plate, on the assumption that the pressure plate will have a diameter that is a practical, desired maximum for an object that must enter the cylinder, allowing a clearance with the inside of the cylinder. Thus, the diameter of the pressure plate can be used as a basis for sizing the pantograph mechanism 48, remembering that neither pantograph 36 lies on a diameter of the pressure plate. Each pantograph 36 will have a maximum height that is a function of the preselected length of the spacer 50 in the pantograph mechanism 48.

According to one plan for coordinating the beam geometry of a pantograph mechanism 48, which will be referred to as "square in the circle geometry," a cross-section of the pantograph mechanism 48 defines a square periphery best shown in FIG. 4. The lateral spacing between the parallel pantograph structures 36 establishes a width of the pantograph mechanism 48 approximately equal to a side element of the square having its corners on a circle that closely fits into a cartridge cylinder. Such a circle may be defined as encompassing the pressure plate, since the pressure plate also must fit into a cartridge cylinder. For purposes of discussion, this circle will be regarded as sized equal to the periphery of pressure plate 28. Thus, when in compacted configuration, the pantograph structures 36 have a height approximately equal to a side element of a square having its corners on a circle that defines the periphery of the pressure plate 28. This geometric plan has the advantage of maximizing the beam height and beam width of the pantograph mechanism 48 when the mechanism is compacted, which is the situation when a new cartridge is in the dispenser 10. Very little deformation in any direction is likely at this instant, which may be an advantage for initiating application of pressure into a new cartridge.

A limitation of using "square in the circle" geometry is that beam height decreases throughout extension, and, other than at initiation, always will be less than beam width. It may be desirable to equalize beam height and beam width at a different point of extension. A midpoint in the length of the holder 30 may offer a good compromise. Relative to the view of FIG. 4, "equalized midpoint" geometry employs a relatively shorter spacer 50 and allows relatively taller links 46. Instead of the square as shown in FIG. 4, the cross-section will be a vertically elongated rectangle that is narrower than the square. When in compacted configuration, the pantograph structures 36 will have a height approximately equal to a side element of a rectangle having its corners on the circle that defines the periphery of the pressure plate. As the rectangle is chosen to be narrow and taller according to the view of FIG. 4, the degree of extension to reach the point where the pantograph mechanism 48 achieves equal height and width moves further toward the distal end of the holder 30.

As is especially evident in the view of FIG. 1, the pressure plate 28 is mounted slightly in front of the pantograph, such that the pressure plate enters a new cartridge cylinder before the pantograph. It may appear that the pantograph will partially extend before entering the cylinder, but this situation cannot be relied upon. Typically, the follower 20 is recessed into the proximal end of even a new cartridge cylinder. Therefore, the pantograph mechanism should be sized to fit within the peripheral outline of the cylinder or pressure plate even before the pantograph mechanism has started to expand.

The pressure plate 28 operates against a follower 20 to discharge the contents of a cartridge. The follower 20 is configured similarly to a piston and tends to maintain proper alignment in the cartridge cylinder. The pressure plate 28 is supported to maintain alignment against the follower. As best shown in FIG. 3, the distal end of the pantograph mechanism 48 is joined to the pressure plate 28 by a pair of side-mounted brackets 52. Pivot pins 54 at the crossed centers of the forward end links 46 attach the pantograph to the brackets 52.

The brackets 52 are forked to define longitudinal slots 56 that are open at their proximal ends. The slots 56 are alignment guides that assist in preventing the pantographs from sagging and thereby applying a skewed force against the pressure plate. Laterally extending pivot pins 54 behind the forward end links serve as sliders that can rest in slots 56 to maintain alignment. The pantograph structures also have pivot connections forming opposite, top and bottom edge pivot rows.

The brackets 52 and alignment guides 56 are combined to perform the dual functions of anchoring the forward end of the pantograph and supporting the alignment of the pantograph. The junction between the brackets 52 and pantographs is at the forward end, central pivot pin 54. In this arrangement, at least one of the pantograph structures is suitably supported to be maintained at a normal angular position with respect to the pressure plate 28. The slot 56 of the alignment guide receives a variable number of the alignment maintenance sliders 54, depending upon the degree of extension of the pantograph structure. As shown by FIGS. 2 and 3, at full extension of the pantograph mechanism 48, at least one laterally extending pin 54 remains in slot 56 of the alignment guide 52. From the view of FIG. 1, it can be seen that the alignment guide 52 can be longer than shown in the drawings, receiving as many as all of the pins 54 when the pantograph is in compacted configuration. With the pantograph at full expansion, such a longer alignment guide might engage two or more pins 54.

The dispenser 10 operates the pantograph mechanism 48 by gradual, optionally intermittent advances. A traditional grip-type actuator 26 can cause the pantograph extending mechanism 42 to operate at intermittent intervals. FIGS. 1-2 show a first embodiment of the grip-type actuator, adapted for use with a pantograph. The actuator is formed of a relatively fixed-position handle 38 and a relatively pivotable bell crank 58. One arm of the bell crank is positioned to serve as trigger 40 in a suitable position for simultaneous hand engagement with the fixed-position handle 38. A user holding handle 38 can move trigger 40 between unsqueezed configuration and squeezed configuration to pivot the second arm 60 of the bell crank.

The pantograph extending mechanism 42 includes a power transmitting element 62 for converting trigger movement to advancement of the pantograph. One suitable power transmitting element 62 is a pawl that is positioned to be operated by the second bell crank arm 60 to move in a first linear direction when the trigger is squeezed. The pawl 62 is positioned to operate a rotary wheel or gear 64 that drives expansion of the pantograph by rotation in a first rotary direction. For example, the rotary gear 64 can be mounted on threaded rod 66 by a one-way clutch or one-way ratchet mechanism, such that gear 64 rotates in a first direction to rotate rod 66 and thereby to expand the pantograph. A one-way mounting allows the gear 64 to rotate freely in the reverse, second direction. The threaded rod is neutrally mounted in base plate 44, such as in a slip ring carrier 68 that permits the threaded rod to rotate in the carrier without producing relative linear movement between the rod and the carrier. The threaded rod extends forward beyond the carrier 68 and into a threaded nut 70, which is attached to a more distal point on the pantograph, such as to the next central pivot beyond the pantograph's mounting to the base plate 44. Rotation of the threaded rod 66 in the first direction advances the nut 70 on rod 66 forward from the base plate and slip ring carrier, forcing the pantograph to expand. A single squeeze of trigger 40 produces an incremental rotation of rod 66, which extends the pantograph by a short distance. With each squeeze, the pressure plate 28 is advanced toward the follower 20, eventually moving the follower 20 to cause the discharge of a limited quantity of the cartridge contents 24.

A retraction mechanism such as crank 72 is arranged to drive the threaded rod 66 in second, reverse rotary direction, to retract the pantograph. The rotary gear 64 and pawl 62 are arranged to allow the retraction crank to turn rod 66 in the second direction. While a one-way ratchet or clutch in the mounting of gear 64 on rod 66 will allow the crank to operate in the desired manner, other arrangements can produce a similar result. For example, gear 64 may be mounted to rod 66 in a fixed relationship. The pawl 62 may be sized or mounted such that it does not engage gear 64 when the trigger 40 is in unsqueezed configuration. In that relationship, the pawl does not lock the rotary gear against reverse rotation. Thus, the pawl 62 may be short enough that it does not contact the rotary gear 64 until the trigger is partially squeezed to advance the pawl across a small initial gap to the gear. With any suitable structure of the expansion mechanism, the retraction mechanism can be arranged to drive the expansion mechanism 42 in second, reverse direction by driving rod 66 in the second direction.

Figures 5, 6:
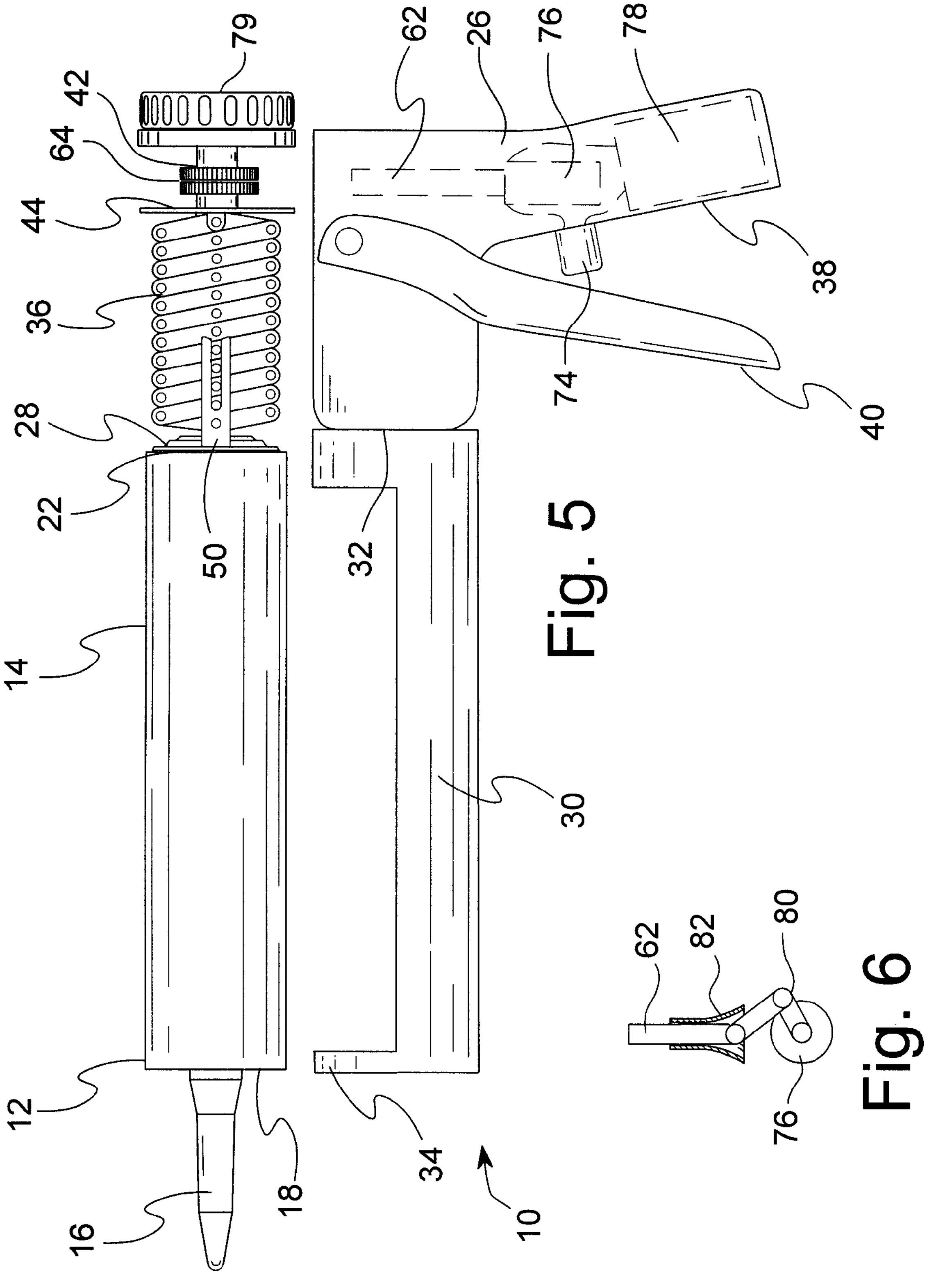
FIG. 5 is a view similar to FIG. 1, showing in phantom a second embodiment of the actuator mechanism employing an electrically operated solenoid and drive pawl.
FIG. 6 is a side elevational view of a detail of a third embodiment of the actuator mechanism employing an electrically driven rotary crank operating a sliding pawl.

FIG. 5 shows a second embodiment of the pantograph expanding mechanism 42. The grip-type actuator 26 is again formed of a relatively fixed-position handle 38 and a trigger 40 that is relatively moveable with respect to the fixed-position handle. The handle 38 and trigger 40 again are arranged for simultaneous hand engagement such that, in use, the trigger is moveable from an unsqueezed configuration to squeezed configuration by a user's hand holding the handle.

In this embodiment, an electrical switch 74 is positioned to be actuated by movement of the trigger 40 to squeezed configuration. It is also suitable for the switch 74 to be located in other positions to be actuated in other ways. For example, the switch may be a toggle switch positioned for the user to flip with his thumb. However actuated, the switch energizes an electrically powered operator 76 for operating the pantograph extending mechanism 42. The operator 76 may be a solenoid. A source 78 of electrical power is connected through the switch 74 to operator 76 to apply power to the operator in response to actuation of the electrical switch. The power source 78 may be a source of D.C. current, such as a battery.

As in the first embodiment, the pantograph extending mechanism 42 is a wheel or gear 64 on a threaded shaft 66, wherein the shaft is suitably connected to the pantograph mechanism 48 to expand the pantograph mechanism in response to rotation of the shaft in a first direction. Where the operator 76 is a solenoid, the power transmitting element 62 is a solenoid core rod that moves linearly when the solenoid is powered. As before, the power transmitting element 62 may be a pawl, which may include a portion serving as the solenoid core, or the solenoid may have an independent core that is operatively connected to transmit motion to the pawl to rotate the wheel 64 in the first direction.

Alternatively, in a third embodiment of the dispenser 10, operator 76 may be an electric motor turning a power transmitting element 62 that is a worm, and wheel 64 may be worm gear that the rotating worm drives in the first direction. In any of these electrically powered arrangements, switch 74 may be an intermittent switch that momentarily provides power to the operator 76, so that repeated squeezing of the trigger is needed to produce successive intervals of dispensing operation. Where the operator 76 is a solenoid, the solenoid may provide the intermittent operation by firing only once per activation. Where the operator 76 is an electric motor and the power transmitting element 62 is a worm, the intermittent switch may operate the motor to turn the worm for a short time period per activation; or the function of the dispenser 10 may be continuous by employing a continuous switch 74 to power the worm 62 as long as the switch is closed.

According to an alternate embodiment of the retraction mechanism shown in FIG. 5, the retraction mechanism provides a hand operated wheel 79 that can retract the pantograph by rotating the pantograph expanding mechanism in reverse direction. The rod 66 is drivable by the wheel 79 in the second direction by direct connection with wheel 79.

FIG. 6 shows a fourth embodiment of the dispenser 10, in which an electrically powered operator 76 and power transmitting element 62 drive the pantograph to expand. In this embodiment, the operator 76 is an electric motor, optionally operating through a gear reducer, to turn a rotary, reciprocating crank 80. The crank reciprocates to advance and retract pawl 62, which optionally is guided in a sleeve 82, mounted in handle 38, to remain functionally aligned with gear 64. As in prior embodiments, the pawl 62 acts on gear 64 to expand the pantograph. This arrangement produces smooth, optionally continuous, operation of the gear 64 and permits continuous automated operation of the dispenser 10 as long as the trigger is squeezed.

Figure 7:
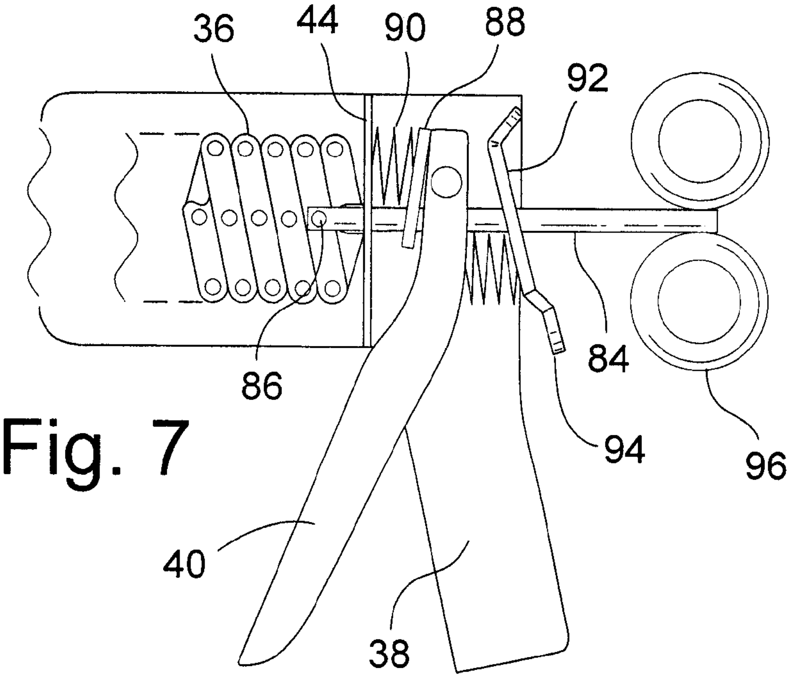
FIG. 7 is a fragmentary view of a caulking gun in partial cross-section, showing a pantograph advancement mechanism in compacted configuration, and showing a fourth embodiment of the actuator mechanism employing a pushrod and binding plate drive.
Figure 8:
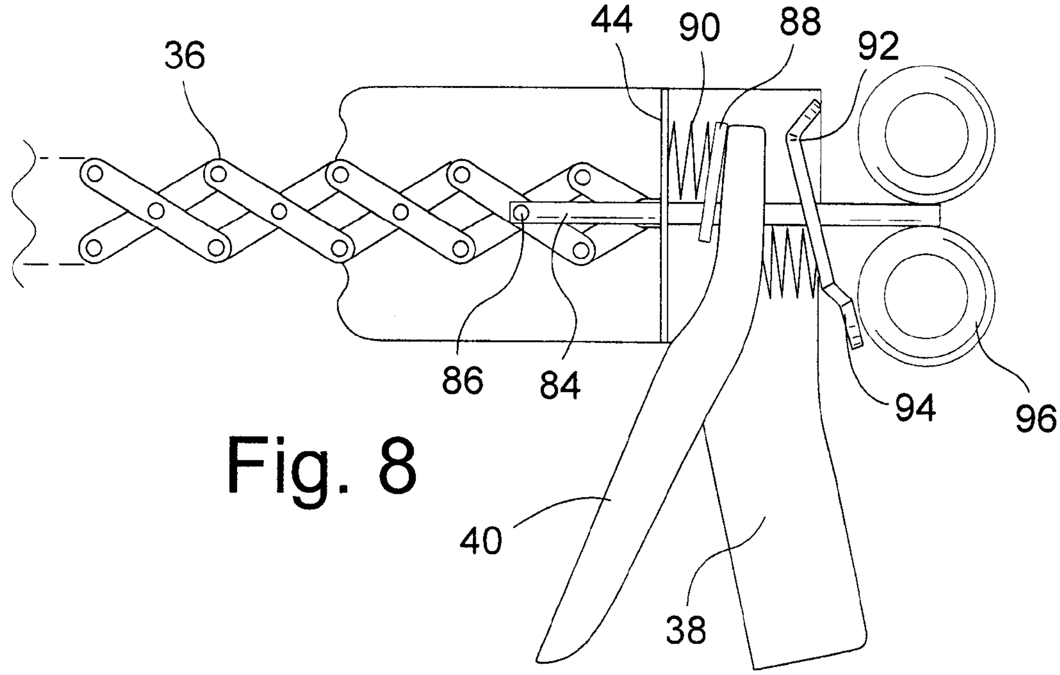
FIG. 8 is a view similar to FIG. 7, showing the pantograph advancement mechanism in extended position.

FIGS. 7 and 8 show a fifth embodiment of the dispenser 10, in which the grip-type actuator 26 incrementally operates a short pushrod 84 that indirectly advances the pressure plate 28. As in prior embodiments, the distal end of the pantograph 36 is fixed to the pressure plate 28 and a proximal end of the pantograph is fixed to base plate 44. The pantograph extending mechanism is pushrod 84, which has proximal and distal ends. The pushrod 84 is suitably connected to the pantograph mechanism 48 to expand the pantograph mechanism in response to longitudinal movement of the pushrod in a first direction. The pushrod 84 extends forward beyond the base plate 44 and is attached to a more distal point on the pantograph, such as to the next central pivot pin 86 beyond the pantograph's mounting to the base plate 44. Advancing the pushrod in the first direction advances pin 86 forward from the base plate 44, forcing the pantograph to expand. The actuator 26 has a pivoted trigger 40 associated with fixed handle 38 of the dispenser 10. A bindable advancement plate 88 is mounted on the pushrod 84 to advance the pushrod when pressed in the distal direction from a position offset from the pushrod. The bindable advancement plate 88 has an aperture that is slightly larger than the diameter of the pushrod 84 and receives the pushrod. When the plate 88 tilts on pushrod 84, it binds on the pushrod.

Trigger 40 is positioned such that when it is selectively actuated, it pushes the bindable plate 88 in the distal direction from a position offset from the pushrod 84, causing the pushrod 84 to expand the pantograph mechanism. The trigger 40 operates by pushing forward on the bindable plate 88 near an edge of the plate. This nonsymmetrical application of force near one edge of the plate 88 first tilts the plate 88 into a binding position on the pushrod and then pushes forward the combined pushrod 84 and plate 88.

According to this fifth embodiment, the actuator assembly 26 supports the pushrod 84 for forward passage through base plate 44 to operatively connect to the pantograph 36. The front end of the pushrod may be attached to the pantograph as close to the base plate as the next central pivot pin 86 beyond the attachment of the pantograph 36 to the base plate 44. Advancing the pushrod forces the pushrod's forward attachment point 86 to move forward and away from the pantograph's attachment to the base plate 44, thereby expanding the pantograph and, in turn, advancing the pressure plate. In this way, trigger motion is converted into forward motion of the pressure plate. A spring 90 pushes back on the advancement plate 88 from its front face to untilt the advancement plate as soon as the trigger releases, leaving the advancement plate 88 in an untilted position on the pushrod.

A spring-loaded brake plate 92 normally engages the pushrod 84 in a tilted, binding position that prevents the pushrod from moving rearward, with the result that the pushrod stays in its advanced position regardless of the advancement plate's being released to untilted position. A thumb release 94 allows the user to untilt the brake plate 92 to release its binding grip on the pushrod 84, which allows the user to retract the pushrod when desired by pulling back on an end grip 96 of the pushrod.

The various embodiments disclose a dispenser 10, which may be caulking gun, that maintains a compact length during all phases of use. The pantograph or lazy tongs mechanism, when fully compacted, fits into the trigger and handle area of the dispenser 10. When expanded, the pantograph can at least triple its compacted length. The various embodiments show both mechanical and electrical means for expanding the pantograph. Both mechanical and electrical drive systems can employ a retraction crank to compact the pantograph without requiring the use of a full length pushrod. In the embodiment employing a pushrod in place of a retraction crank, the pushrod is less than half the length of the dispenser 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. A dispensing tool that operates in combination with a replaceable, insertable cartridge of predetermined dimensions, having dispensable contents therein, with a follower that is a part of the cartridge, to dispense the dispensable contents of the cartridge by operation of a grip-type actuator of the tool that advances a pressure plate against the follower, thereby advancing the follower toward an exit port of the cartridge to produce a metered discharge of the dispensable contents there through, the dispensing tool comprising:

a holder having proximal and distal ends and sized to receive the cartridge of said predetermined dimensions and to retain the cartridge against advancement of said pressure plate toward said distal end and against the follower; and a pantograph mechanism located intermediate said pressure plate and said grip-type actuator, wherein the grip-type actuator provides a selectively actuated trigger that operates a pantograph extending mechanism to cause said pantograph to advance the pressure plate toward said distal end of said holder;

wherein:

said pressure plate is a disk of circular periphery;

said pantograph mechanism is formed of at least two pantograph structures arranged in parallel such that said at least two pantograph structures are simultaneously moveable between compacted and extended configurations;

said parallel pantograph structures are interconnected by spacers of preselected length, establishing a lateral spacing between the parallel pantograph structures, wherein the lateral spacing establishes a width of the parallel pantograph structures approximately equal to a side element of a square having corners of said square on the circle encompassing the periphery of the pressure plate; and when in compacted configuration, the pantograph structures have a height approximately equal to a side element of a square having corners of said square on the circle encompassing the periphery of the pressure plate.

2. The dispensing tool of claim 1, wherein:

said pressure plate carries at least one alignment guide engaging at least one of the pantograph structures in an arrangement suitable to maintain the at least one pantograph structure in normal angular position with respect to the pressure plate.

3. The dispensing tool of claim 2, wherein:

said pantograph structures have pivot connections forming at least a central pivot row and opposite edge pivot rows;

said pantograph mechanism is attached to said pressure plate at said central pivot row;

the central pivot row of at least one pantograph structure includes alignment maintenance sliders extending laterally of the at least one pantograph structure; and said alignment guide provides a slot receiving a variable number of said alignment maintenance sliders, depending upon the degree of extension of the at least one pantograph structure.

4. The dispensing tool of claim 3, wherein:

said alignment guide is of sufficient length to engage said slot with at least one alignment maintenance slider when said at least one pantograph structure is in extended configuration.

5. The dispensing tool of claim 4, wherein:

said pantograph mechanism is attached to said pressure plate at said alignment guide.

6. The dispensing tool of claim 1, wherein:

a distal end of said pantograph mechanism is fixed to said pressure plate and a proximal end of the pantograph mechanism is fixed near said proximal end of said holder;

said pantograph extending mechanism comprises:

a pushrod with proximal and distal ends, wherein a distal portion of the pushrod is connected between proximal and distal end of the pantograph mechanism such that movement of the pushrod in the distal direction expands the pantograph mechanism;

a bindable advancement plate mounted on the pushrod to advance the pushrod when pressed in the distal direction from a position offset from the pushrod; and said trigger is positioned, when selectively actuated, to push said bindable plate in the distal direction from a position offset from the pushrod, thereby causing the pushrod to expand the pantograph mechanism.

7. A dispensing tool that operates in combination with a replaceable, insertable cartridge of predetermined dimensions, having dispensable contents therein, with a follower that is a part of the cartridge, to dispense the dispensable contents of the cartridge by operation of a grip-type actuator of the tool that advances a pressure plate against the follower, thereby advancing the follower toward an exit port of the cartridge to produce a metered discharge of the dispensable contents there through, the dispensing tool comprising:

a holder having proximal and distal ends and sized to receive the cartridge of said predetermined dimensions and to retain the cartridge against advancement of said pressure plate toward said distal end and against the follower;

a pantograph mechanism located intermediate said pressure plate and said grip-type actuator, wherein the grip-type actuator provides a selectively actuated trigger that operates a pantograph extending mechanism to cause said pantograph to advance the pressure plate toward said distal end of said holder;

wherein said grip-type actuator comprises:

a relatively fixed-position handle and a relatively pivotable bell crank arranged with respect to said fixed-position handle with one arm positioned as a trigger for simultaneous hand engagement with the fixed-position handle such that, in use, the trigger is moveable from unsqueezed configuration to squeezed configuration to pivot the second arm of the bell crank by a user's hand holding the handle; and said pantograph extending mechanism comprises:

a pawl positioned with respect to said bell crank to be operatively moveable in a first linear direction by the second arm of the bell crank when said trigger is moved to squeezed configuration;

a rotary gear positioned with respect to said pawl to be incrementally rotated in a first rotary direction by movement of said pawl in the first linear direction; and a threaded rod turned by rotation of said rotary gear in a first direction and connected to said pantograph mechanism to expand the pantograph mechanism when the threaded rod is driven in the first direction.

8. The dispensing tool of claim 7, further comprising:

a retraction mechanism arranged to drive said threaded rod in a second, reverse direction to contract said pantograph mechanism.

9. The dispensing tool of claim 8, wherein:

said retraction mechanism is attached to a proximal end of said rod.

10. The dispensing tool of claim 8, wherein:

said retraction mechanism is arranged to drive said threaded rod in second direction by driving said rotary gear in a second direction; and said rotary gear and pawl are arranged such that the rotary gear is drivable by said retraction crank in second direction when said trigger is in unsqueezed configuration.

11. A dispensing tool that operates in combination with a replaceable, insertable cartridge of predetermined dimensions, having dispensable contents therein, with a follower that is a part of the cartridge, to dispense the dispensable contents of the cartridge by operation of a grip-type actuator of the tool that advances a pressure plate against the follower, thereby advancing the follower toward an exit port of the cartridge to produce a metered discharge of the dispensable contents there through, the dispensing tool comprising:

a holder having proximal and distal ends and sized to receive the cartridge of said predetermined dimensions and to retain the cartridge against advancement of said pressure plate toward said distal end and against the follower;

a pantograph mechanism located intermediate said pressure plate and said grip-type actuator, wherein the grip-type actuator provides a selectively actuated trigger that operates a pantograph extending mechanism to cause said pantograph to advance the pressure plate toward said distal end of said holder;

wherein said grip-type actuator comprises:

a relatively fixed-position handle and a trigger that is relatively moveable with respect to said fixed-position handle, wherein the handle and said trigger are arranged for simultaneous hand engagement such that, in use, the trigger is moveable from an unsqueezed configuration to squeezed configuration by a user's hand holding the handle;

an electrical switch positioned to be actuated by movement of the trigger to squeezed configuration;

an electrically powered operator for operating said pantograph extending mechanism in response to actuation of said electrical switch; and a source of electrical power connected to the switch and to said operator to power the operator in response to actuation of the electrical switch.

12. The dispensing tool of claim 11, wherein:

said pantograph extending mechanism is a wheel on a threaded shaft, wherein said shaft is suitably connected to said pantograph mechanism to expand the pantograph mechanism in response to rotation of the shaft in a first direction; and said operator includes a pawl that is movable to rotate said wheel in said first direction.

13. The dispensing tool of claim 12, wherein:

said wheel is toothed;

said operator includes a solenoid having a core that is linearly moved when the solenoid is electrically actuated; and said core is connected to move said pawl to rotate said toothed wheel in said first direction when the solenoid is electrically actuated.

14. The dispensing tool of claim 12, wherein:

said operator includes an electrically powered rotary mechanism driving a reciprocating crank; and said reciprocating crank is connected to move said pawl to rotate said wheel in said first direction when the rotary mechanism is electrically actuated.

* * * * *

UNITED STATES PATENT AND TRADEMARK OFFICE

CERTIFICATE OF CORRECTION

PATENT NO. : 8,919,617 B2
APPLICATION NO. : 13/678549
DATED : December 30, 2014
INVENTOR(S) : Foley et al.

It is certified that error appears in the above-identified patent and that said Letters Patent is hereby corrected as shown below:

Title Page, Item (12) delete “Foley” and insert --Foley et al.--.

Title Page, Item (72) Inventor should read

--(72) Inventors: Thomas S. Foley, Centennial, CO (US); Albert William Gebhard, Denver, CO (US)--.

Signed and Sealed this
First Day of December, 2015

Michelle K. Lee
*Director of the United States Patent and Trademark Office*